Patented Sept. 5, 1939

2,172,312

UNITED STATES PATENT OFFICE 2,172,312

DISSOLUTION OF FERRIC SULPHATE

John F. White, Medford, Mass., assignor, by mesne assignments, to Monsanto Chemical Company, St. Louis, Mo., a corporation of Delaware No Drawing. Application June 20, 1936, Serial No. 86,351

4 Claims. (Cl. 23—126)

The present invention relates to the preparation of water solutions of normal anhydrous ferric sulphate; this application is a continuation in part of my copending joint application Serial Number 71,878, filed March 31, 1936.

Dilute solutions of normal anhydrous ferric sulphate $Fe_2O_3(SO_3)_3$ are valuable coagulants in the treatment of industrial and domestic water supplies, sewage waste, and the like. Heretofore, materials such as alum, copperas and the like have been used for this purpose.

When hydrated salts, such as ordinary commercial alum, copperas, and the like, are mixed with water dissolution is rapid even when the water is cold. Pellets of normal ferric sulphate dissolve in cold water very slowly. Thus, whereas commercial alum or copperas may dissolve in cold water within a period of hours, under similar conditions pellets of normal ferric sulphate may require days and even weeks to dissolve. Anhydrous ferric sulphate dissolves readily in hot water, but a supply of hot water is frequently not available and, in any case, adds to the cost of the installation and the water treatment.

The object of the present invention is to provide a convenient method of forming dilute solution of ferric sulphate from pellets of anhydrops ferric sulphate with water which is of ordinary atmospheric temperature.

The present invention is based upon the discovery that when treated with a relatively restricted proportion of water, pellets of normal anhydrous sulphate may be caused to pass quickly and substantially completely into solution. The concentrated solution thus obtained may be diluted to obtain solutions of any desired concentration.

The present invention applies particularly to normal anhydrous ferric sulphate in the form of porous, nodular, concretionary pellets, such as are disclosed in my joint patent applications numbers: 725,901 filed May 16, 1934, and 71,878 filed March 31, 1936. According to the first of these applications, concretionary pellets of normal anhydrous ferric sulphate are obtained by the admixture of a concentrated solution of normal ferric sulphate with sufficient crushed anhydrous ferric sulphate to take up the water of solution as water of hydration. The dry but hydrated pellets of normal ferric sulphate are then calcined at a temperature of about 400° or 500° C. to expel the water of hydration and leave the pellets in anhydrous state.

According to the second application, finely ground ferric oxide is treated with sulphuric acid of about 93% concentration in an amount slightly in excess of that theoretically required to form normal ferric sulphate. A reaction temperature of 140° C. or above is maintained over a period of several hours and ferric sulphate in the form of cakes of partially hydrated material is obtained. The cakes are crushed and admixed in a suitable agitating device, such as a concrete mixer, with 10% or 12% of water. As a result, the crushed material is agglomerated into dry but partially or completely hydrated concretionary pellets which can be calcined at a temperature of 400° or 500° C. without decrepitation. The pellets, as obtained by either of the foregoing methods, are free flowing, non-caking, substantially free from basic insoluble sulphates and usually of about four to eleven mesh.

Under the conditions of my process pellets of normal anhydrous ferric sulphate dissolve more readily in their own concentrated solution than in a large quantity of water such as would give directly dilute solution of ferric sulphate. Reduction of the ratio of water employed in dissolving the sulphate paradoxically increases the rate of solution of the compound. The ratio by weight of water to ferric sulphate is maintained within the range of approximately 1.5 to 3 parts of water per part of ferric sulphate; effective dissolution of the ferric sulphate is obtained in initially cool or cold water within a period of thirty minues.

According to one embodiment, I charge an acid resisting tank with the pellets of anhydrous ferric sulphate together with water equal to 150–200% by weight of the sulphate. Within a short period of time the temperature of the water increases nearly to boiling point whereupon the ferric sulphate is quickly hydrated and dissolved, after which any additional quantity of water may be added to attain the desired concentration. In case the water begins to boil, one may add additional fresh water to facilitate the dissolution without otherwise reducing the rate of dissolution.

In actual practice I have found it convenient to employ the water in the ratio of about 2 parts, per part of ferric sulphate and desirable to mix the water and the sulphate continuously by means of a stream of air, or, mechanically in a pot or tank of sufficient size to admit of complete solution of the materials while they are contained therein. This process of dissolving ferric sulphate is simple in character and, because of the rapidity of solution of the ferric sulphate, only relatively small and inexpensive apparatus is required. For these reasons the process is highly desirable for commercial purposes.

If desired, a continuous dissolver may be used, in which case tanks of even smaller capacity are adequate. To dissolve one thousand pounds of ferri sulphate in two thousand pounds of water, daily, a lead or rubber lined pot of approximately 7½ gallons capacity, provided with suitable means for agitation, is fed continuously with ferric sulphate and cold water. In starting the unit it is advantageous to heat up the equipment or use an initial charge of warm water. Conventional solid and liquid feeding devices are satisfactory for feeding continuously the water and ferric sulphate. By increasing the temperature of the feed water the dissolving capacity of the unit is increased many fold.

Athough only the preferred forms of the invention have been described, it will be apparent to those skilled in the art that numerous modifications may be made therein without departure from the spirit of the invention or the scope of the appended claims.

What I claim is:

1. The method of preparing a dilute solution of normal ferric sulphate which comprises admixing pellets of normal anhydrous ferric sulphate formed by calcining hydrated ferric sulphate with water of ordinary atmospheric temperature in the ratio of about 1 to 3 parts by weight of water per part of the ferric sulphate and agitating the mixture whereby substantially complete solution is readily attained and thereafter adding the concentrated solution of ferric sulphate thus formed to water in an amount such as to give the desired final concentration.

2. The method of forming a dilute solution of normal ferric sulphate wherein pellets of anhydrous ferric sulphate formed by calcining hydrated ferric sulphate are added to water which is not substantially warmer than water of the atmospheric temperature, which method is characterized in that 1 to 3 parts by weight of water are mixed with one part of normal anhydrous ferric sulphate pellets while avoiding loss of heat and thus readily effecting substantially complete dissolution to form a concentrated solution and thereafter adding the concentrated solution of ferric sulphate to such an amount of water whereby the desired dilute solution of ferric sulphate is obtained.

3. The method as defined in claim 2 and further characterized in that approximately 2 parts of water by weight are mixed with one part by weight of anhydrous ferric sulphate.

4. The method of producing a dilute solution of ferric sulphate from anhydrous pellets of normal ferric sulphate prepared by cacining hydrated ferric sulphate, characterized in that the pellets are wet with approximately 150–200% of their weight of water of ordinary room temperature, allowing the temperature to rise whereby the pellets are hydrated and dissolved thereby readily forming a concentrated aqueous solution of ferric sulphate and finally adding water to the concentrated solution to produce the desired dilute solution.

JOHN F. WHITE.